United States Patent Office 3,223,970
Patented Dec. 14, 1965

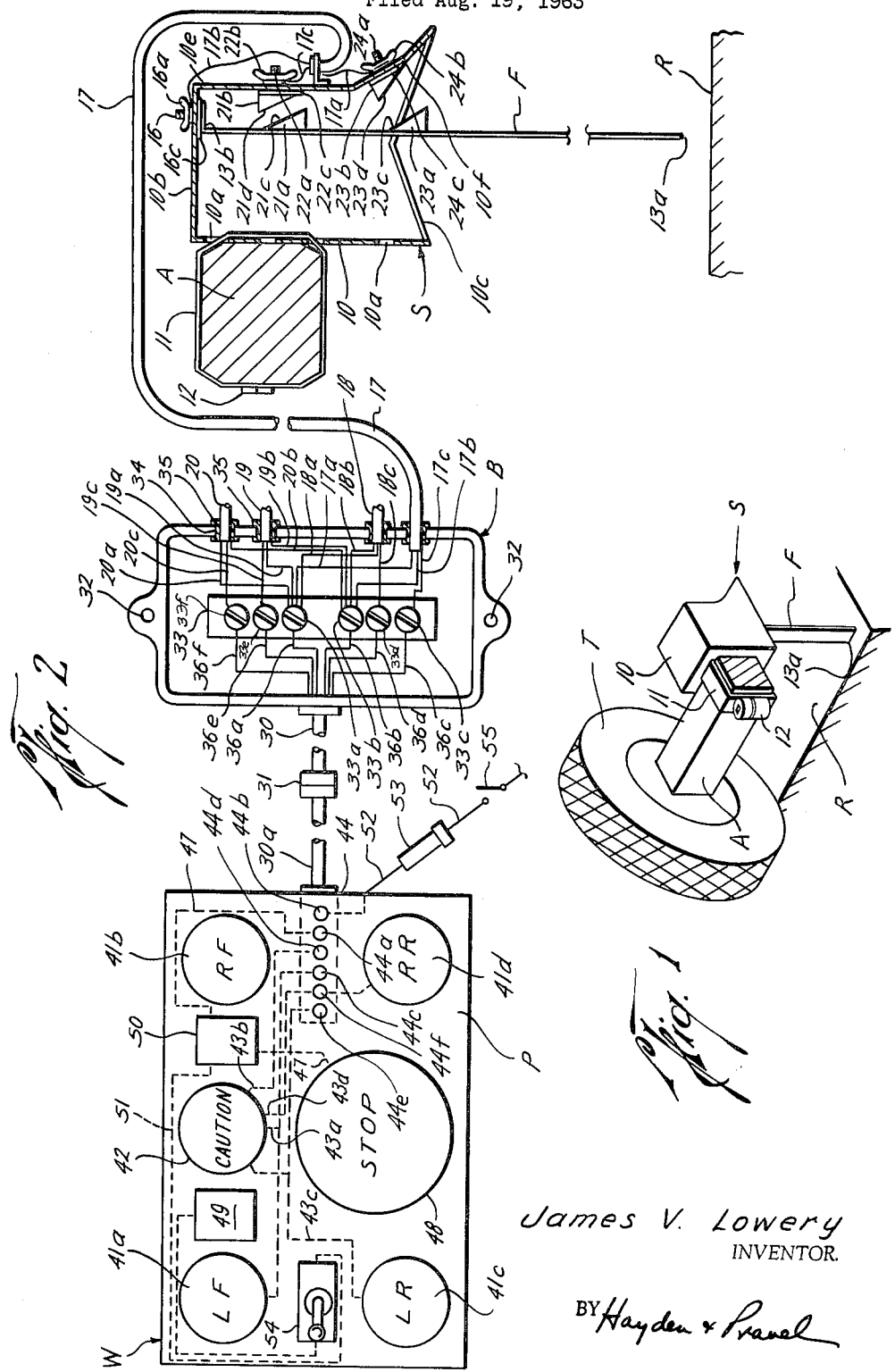

3,223,970
TIRE DEFLATION SIGNALLING DEVICE
James V. Lowery, 1225 N. Shepherd Drive,
Houston, Tex.
Filed Aug. 19, 1963, Ser. No. 303,099
4 Claims. (Cl. 340—58)

This invention relates to a new and improved device for providing signalling to indicate deflation of inflatable tires on a vehicle.

An object of this invention is to provide a new and improved tire deflation signalling device which signals the vehicle operator as to the condition of one or more inflatable tires mounted on his vehicle.

A further object of this invention is to provide a new and improved tire deflation signalling device which provides one or more signals to indicate one or more gradations of tire deflation.

An important object of this invention is to provide a new and improved tire deflation signalling device which provides a warning signal indicating partial tire deflation and also provides a stop signal indicating when tire deflation has reached a danger point so that the vehicle should be stopped immediately to prevent cutting or other permanent damage to the inflatable tire.

An additional object of this invention is to provide a new and improved tire deflation signalling device which includes a flexible contact member adapted to contact the roadway and having an electrical terminal thereon normally spaced from another terminal so that when the tire is deflated a predetermined amount, the contact member is moved laterally to engage the terminals and complete an electrical circuit having a signalling means therewith.

Yet another object of this invention is to provide a new and improved tire deflation signalling device which may be installed on vehicles using tires and/or wheels of various diameters.

Still another object of this invention is to provide a new and improved tire deflation signalling system which provides signals relating to tire deflation of a plurality of tires installed on an automobile, truck, trailer, or other such vehicle by audible and/or visual signals emitted from a panelled warning device which provides an indication of the particular deflated tire.

Yet a further object of this invention is to provide a new and improved tire deflation signalling device which provides a warning signal indicating partial tire deflation, a signal indicating even further tire deflation, and a signal indicating tire deflation which subjects the tire to permanent damage.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an isometric view of the sensing means of this invention mounted on an axle associated with a vehicle wheel and tire; and FIG. 2 is a view of the deflation signalling apparatus of this invention with a sensing means for one tire shown in vertical section and with a signal panel electrically connected therewith for signalling the condition of one or more tires.

Considering the invention broadly, the drawings illustrate a sensing device S which is adapted to be mounted on an axle A for indicating deflation of an inflatable tire T. Preferably, one sensing device S is mounted near each tire T on the vehicle. Each sensing device S has a feeler F projecting toward the roadway R for deflection when the axle A moves downwardly due to deflation of the tire T adjacent thereto. Such deflection of the feeler F completes an electrical circuit, as will be explained, which is preferably connected through a terminal box B to a signalling or warning device W which is usually on a panel mounted in the cab or on the dashboard of a vehicle for readily signalling the operator of the vehicle.

As will be more evident hereinafter, the apparatus of this invention is particularly suitable for providing a caution signal when a tire is partially deflated and for subsequently providing a danger or stop signal when the tire has become so deflated that further movement of the vehicle might cut or permanently damage the tire. Further, it is possible for the apparatus to provide an intermediate signal indicating a tire deflation gradation intermediate the two conditions mentioned hereinabove.

Specifically, the preferred embodiment of the sensing device S is shown in FIG. 1 as including a shield or box 10 of metal or the like employed to protect and mount the parts contained therein, a flexible strap 11 for fastening purposes, and a clamp 12 of conventional construction used to connect the ends of the strap 11 wrapped around the axle A. The invention is intended for use with a wheeled vehicle such as a house trailer having an axle but may be attached to other portions of a vehicular undercarriage if desired. As shown in FIG. 2, the strap 11 is passed through two of a group of holes 10a in the shield 10 to secure the sensing device S to the axle A at the proper elevation above the roadway R. The holes 10a allow the sensing device S to be installed at various heights above the roadway R so that the feeler tip 13a is positioned at selected distances above the roadway R. The holes 10a chosen for a given installation depend on the diameter of the tire T, the load placed on the tire T, and the air pressure in the tire T. The distance between the tip 13a and the roadway R may also be adjusted in relation to the smoothness of the roadway R so that the tip 13a may be placed close to a very smooth highway surface which has few or no bumps which might possibly cause brief, spurious indications.

The feeler F is attached to the roof 10b by a bolt 16 and nut 16a and it extends downwardly from the roof 10b through the open bottom 10c of the shield 10 to a point which is a predetermined distance above the roadway R. An insulation washer 16c or other means is provided between the roof 10b and the upper flange 13b of the feeler F so that an electrical wire 17b may apply its voltage only to the feeler F as will be explained.

A wedge shaped terminal 21a having a face 21c is attached by welding or other suitable means to the rear face of the feeler F at a location below the flange 13b. A mating terminal 21b, having a complementary contacting surface 21d, is spaced from the terminal 21a where it is mounted on the vertical back wall 10e of the box 10. A bolt 22a is passed through a hole in the wall 10e and a wing nut 22b tightened thereon to secure the mating terminal 21b in place. An insulating washer 22c is placed between the terminal 21b and the wall 10e to electrically insulate the wall 10e from any voltages placed on the terminal 21b. When the tip 13a of the feeler touches the roadway R with the vehicle moving forward, the feeler F deflects rearwardly to bring the treminals 21a and 21b into contact causing the voltage of the wire 17b to be connected to the wire 17c through the feeler F, terminals 21a and 21b, and bolt 22a, as will be more fully explained.

In the preferred embodiment shown in FIG. 2, a second wedge shaped terminal 23a having a face 23c is welded or otherwise secured to the feeler F at a point below the terminal 21a and may be identical thereto for ease of fabrication. A mating terminal 23b, having a complementary face 21d, is spaced a greater distance from the terminal 23a than the distance which separates the terminals 21a and 21b for reasons to be explained. The mating terminal 23b is secured to an angular portion 10f of the box 10 by a bolt 24a and a wing nut 24b. An insulating washer 24c or other suitable insulation is placed between the terminal 23b and the shield 10.

As mentioned hereinabove in reference to the terminals 21a and 21b, the elevation sensing feeler F deflects rearwardly toward the wall-mounted mating terminals 21b and 23b when the sensing device S is lowered toward the roadway R. After a larger amount of the deflection, the feeler F bends toward the terminal 23b to bring the face 23c of the terminal 23a into electrical contact therewith to complete an electrical circuit with wires 17a and 17b, as will be more evident hereinafter. The voltage on the bolt 24a is sensed by the wire 17a which, as a matter of convenience, is grouped with the wires 17b and 17c into a conduit 17 for connection to components such as the warning device W which are preferably physically removed from the location of the sensing device S.

The conduit 17 extends from the sensing device S (FIG. 2) to the terminal box B where such conduit 17 and any similar conduits such as 18, 19, and 20 from other sensing devices S on the other wheels of the vehicle are collected for purposes of further connection to the warning device W. Also, since the invention is adaptable for use on a truck, trailer, or other separable vehicular portion, it is preferable to provide a terminal box B for ease and convenience of connecting the various electrical wires from the wheels to the warning device W.

The terminal box B is mounted at some convenient location on a trailer or other separable vehicular portion with the cables 17–20, inclusive, entering the box B and with a cable 30 emerging therefrom. The cable 30 is usually fitted with a quick disconnect coupling 31 of conventional construction which is located for connection to the warning device W in either the operator's compartment or on the trailer. The terminal box B may be bolted to the trailer or other vehicle by inserting bolts through a pair of ears 32. A terminal strip 33 is placed centrally in the box B adjacent a number of holes 34 equipped with insulating feed throughs 35 through which the conduits 17–20, inclusive from the various wheels extend. The individual wires of each conduit 17, 18, 19 and 20 are connected to the terminal strip 33 as schematically illustrated in FIG. 2, or in any suitable manner.

Since the wires from each of the conduits 17, 18, 19, and 20 are preferably connected in the same manner, the following description of the connections of the wires in the conduit 17 will suffice for an understanding of the manner of connecting the wires in the cables 18, 19 and 20. The wire 17a which extends from the lowermost terminal 23b on the feeler F passes through the conduit 17 and is connected to a terminal 33a and the wire 17b is likewise connected from the bolt 16 to the terminal 33b. The conductor 17c from the contact 21b is connected to the terminal 33c. The conductors 18a, 19a and 20a are grouped for connection to the terminal 33a and the wires 18b, 19b and 20b are connected to the terminal 33b. The wires 18c, 19c and 20c are connected to the terminals 33d, 33e and 33f respectively. Each of the terminals 33a through 33f is connected to one of a set of wires 36a through 36f, respectively, and grouped for enclosure in the cable 30.

The cable 30 is connected through the quick disconnect 31 to the portion designated at 30a which extends to the warning device W. The warning device W is equipped with a front panel P having transparent plates 41a, 41b, 41c, 41d, 42 and 48 which are preferably circular and of glass, plastic or the like. The segment 41a is encoded with the letters "LF" to refer to the left front wheel, the plates 41b, 41c and 41d are encoded with similar symbols "RF," "LR," and "RR" likewise referring to other wheels, and the segments 42 and 48 are labeled with the words "CAUTION" and "STOP," respectively. FIG. 2, while illustrating pictorially the face of the panel P, also shows schematically the wiring and circuitry used to operate the warning device W.

A single light bulb of signal strength is placed behind each of the plates 41a, 41b, 41c, 41d and 48, while four similar light bulbs are placed behind the indicator 42. A wire 43a connects the lamp behind the "LF" plate 41a and one of the lamps placed behind the indicator 42. In like manner, the bulbs behind the plates 41b, 41c and 41d are each connected to one of the remaining bulbs behind the plate 42 by the conductors 43b, 43c, and 43d, respectively.

The wires 36a–36f, inclusive, are connected to a terminal strip 44 with the terminals 44a through 44f used to achieve connection to the wires 36a–36f, respectively. The wires 36c, 36d, 36e and 36f, are, by way of terminals 44c, 44d, 44e and 44f, respectively, each connected to the wires 43a, 43b, 43c and 43d, respectively. The wire 36b, running from the terminal 33b, is connected to the terminal 44b which also has a wire 52 connected from the terminal to the vehicular power source (not shown). A fuse and fuse holder 53 are placed in the wire 52 for protection of the equipment and an on-off switch is shown at 55 positioned to interrupt current flow as desired.

The wire 36a is connected to the terminal 44a which is also connected to a wire 47. The wire 47 connects to the light bulb behind the "STOP" plate 48 and is shown with a blinker element 50 connected in the wire 47 before the lamp for interrupted operation and increased noticeability. A noise maker such as a buzzer 49 is connected by a wire 51 through an on-off switch 54 to the blinker element 50 for creation of a sound when the plate 48 glows.

The above-mentioned connections apply power from the vehicular power system through the on-off switch 55, the wire 52, the fuse holder and contained fuse 53 to the terminal 44b. The terminal 44b is connected to the wire 36b which connects to the terminal 33b. The terminal 33b is connected to the wire 17b which is enclosed in the cable 17 which runs to the sensing device S and connects to the bolt 16. On contact of the terminals 23a and 23b, an electrical path is established with the above mentioned connections and including the lowermost mating terminal 23b, the wire 17a, the terminal 33a, the wire 36a, the terminal 44a, the wire 47, the blinker element 50, and the bulb behind the "STOP" plate 47. And a conducting path includes the terminal 21b, the wire 17c, the terminal 33c, the wire 36c, the terminal 44c, the wire 43a, and the two lamps attached to the wire 43a and placed behind the plates 41a and 42.

In the operation of the invention, the warning device is preferably mounted on the dashboard of a truck tractor, automobile, or other operator's compartment and the wire 52 is connected to obtain electrical power from the self-contained electrical system of the vehicle. The cable 30a is extended to connect to the connector 31 for communication with the terminal box B. The terminal strip 33 of the terminal box B may have any number of terminals, but it is shown for use on a vehicle having four sensing devices S mounted near four inflatable tires. For ease of understanding, the operation of sensing device S shown in FIG. 2 will be explained under the assumption that it is mounted in proximity of the left front inflatable tire on a vehicle. Of course, any number of sensing devices S may be connected to the terminal box B and mounted on the vehicle for operation in a similar manner.

When the inflatable tire T has standard internal air pressure, the feeler F mounted nearby is maintained with the tip 13a above the roadway R as shown in FIG. 2. As the tire T deflates minutely, the tip 13a is lowered to contact the roadway R and will drag rearwardly as the vehicle moves forward. The feeler F will deflect in relation to the decrease in tire pressure as the axle A carries the sensing device S closer to the roadway R. When the tire deflation causes a predetermined degree of deflection, the feeler F will carry the contact 21a against the contact 21b. Such contact with the terminal 21a applies a voltage to the mating terminal 21b to illuminate the plates 41a and 42 to warn or alert the vehicle driver. Current flows from the vehicular power system to the terminal 21a and then from the terminal 21b to the aforementioned light bulbs when the circuit is closed. When the lamps behind the "LF" and "CAUTION" plates 41a and 42 light, the driver is informed that a gradation of deflation within a predetermined range has endangered the left front tire so that he may plan any emergency maneuvers considered necessary. If he is on a bridge, freeway or in any other situation in which it is difficult to stop, he may drive a short distance to a safe location for tire service with confidence that the tire will not be harmed by cuts inflicted by the weight of the vehicle on the rim of the wheel.

The "LF" and "CAUTION" plates 41a and 42 will remain illuminated for a range of deflection as the feeler F drags on the roadway R. FIG. 2, which is a side view of the feeler F and the terminals 21a and 21b, illustrates that the feeler F will bend or bow from the anchored flange 13b to the rear to contact the terminal faces 21c and 21d to one another. On contact, the terminals prevent the upper portion of the feeler F from bowing any further while the lower portion is allowed to further deform in response to greater tire deflation. The terminals 21a and 21b are constructed to maintain sliding contact with one another over a range of tire deflation so that the normal or typical road surface deviations which jiggle or move the feeler F will not alter the signal of the warning device W.

When the tire T loses air to become flat or very nearly flat, the feeler F bends further toward the rear of the vehicle to touch the faces 23c and 23d of the lower terminals and operate the "STOP" light bulb on the warning device W. The bending of the feeler F bows the feeler F somewhat above the lower terminals to disconnected or end the contact of the uppermost terminals soon after the lower terminals contact. The further bending of the feeler F and the contacting of the terminals attached thereto turns the "STOP" plate 48 light bulb and the buzzer 49 on to form an intermediate signal of tire deflation which continues until further tire deflation deflects the feeler F to separate the terminals 21a and 21b which dims the bulbs behind the "LF" and "CAUTION" plates 41a and 42. Of course, the blinker element 50, if installed, interrupts the current to blink the light and alternately operate the buzzer 49. The driver is alerted that the vehicle has a flat tire and further knows that the degree of deflation is such as to subject the tire to harm rather quickly. Once the "STOP" indicator 48 is lighted and the buzzer 49 is operated, the switch 54 may be actuated to disconnect the buzzer 49 to prevent annoyance resulting from the intermittent buzzing sound. The terminals 23a and 23b, just as terminals 21a and 21b operate, maintain contact even though the feeler F bends extensively because the faces 23c and 23d slide against one another to change the pivot point of the feeler F. The integrity of the contact is further aided by the sliding facial contact which tends to clean the faces of dirt, mud, or the like.

Certain alterations may be made in the invention without departing therefrom. The materials used for the fabrication of the sensing device S may be altered as long as proper electrical connections are maintained. Feeler F may be partially rubber coated to prevent excessive wear at the tip 13a. A rubber boot, of proper flexibility, may be installed on the box 10 to exclude water from the contacts therein. The warning device W may be expanded for use on vehicles having many wheels and a multiplicity of sensing devices S may be installed on the vehicle. The plates of the warning device may be color coded to further accent the indication formed by the warning device W.

The foregoing disclosure and description of the invention is illustrative and explanatory thereof, and various changes in the size, shape, and materials, as well as in the details of the illustrated construction may be made within the scope of the appended claims without departing from the spirit of the invention.

What is claimed is:

1. A tire deflation signalling device adapted for installation on a wheeled vehicle equipped with a tire, comprising:
   (a) a feeler fixedly mounted with respect to a wheel having an inflatable tire mounted thereon to extend toward the roadway without contact therewith when said inflatable tire has a standard internal pressure,
   (b) a plurality of terminals mounted at various locations on said feeler,
   (c) mating terminals spaced apart from said feeler with the uppermost mating terminal located so as to bear against the uppermost terminal located on said feeler on slight deflection of said feeler and the remainder of said mating terminals spaced progressively further apart from said feeler so as to bear against said terminals on greater deflection of said feeler,
   (d) means forming an electrical signal when the uppermost mating terminal bears against the uppermost terminal, said means forming different signals to indicate gradations of deflection of said feeler, and
   (e) a warning device mounted on said vehicle to inform the operator of said vehicle of the internal pressure of said inflatable tire in response to signals formed by said means.

2. A tire deflation signalling device adapted for installation on a wheeled vehicle equipped with a tire, comprising:
   (a) a flexible feeler fixedly mounted at the upper end adjacent a wheel having an inflatable tire mounted thereon to extend from the underside of a vehicle toward the roadway and terminating thereabove when said inflatable tire has standard internal air pressure, said feeler being of such a length to contact the roadway on occurrence of a predetermined amount of deflation of said tire so that said feeler deflects rearwardly when said vehicle moves in a forward direction,
   (b) a plurality of terminals mounted on said feeler at various locations on the deflectable portion thereof,
   (c) mating terminals spaced apart from said feeler with the uppermost mating terminal located to contact the uppermost terminal on said feeler when said feeler is slightly deflected by contact with said roadway, and the remainder of said mating terminals spaced progressively further apart from said feeler so as to contact the remainder of terminals on said feeler as said feeler is further deflected,
   (d) means forming an electrical signal when said feeler is deflected to cause contact between one of said terminals and one of said mating terminals, said means forming different signals to indicate gradations of deflection of said feeler, and
   (e) a warning device mounted on said vehicle to inform the operator of said vehicle of the internal pressure of said inflatable tire in response to signals formed by said means upon deflection of said feeler.

3. A tire deflation signalling system for installation on a wheeled vehicle equipped with inflatable tires, comprising:
   (a) a plurality of feelers, each of which is fixedly mounted at its upper end adjacent a wheel having an inflatable tire mounted thereon to extend from the underside of a vehicle toward the roadway and terminating thereabove when said inflatable tire has standard internal air pressure, said feelers being of such a length to contact the roadway on occurrence of deflation of said adjacent tire so that said feelers deflect rearwardly of said vehicle when said vehicle moves forward, (b) a plurality of terminals mounted on each of said feelers at various locations on the deflectable portions thereof, (c) mating terminals spaced apart from each of said feelers with the uppermost mating terminal located to contact the uppermost terminal on said nearby feeler when said feeler is slightly deflected by contact with said roadway, and the remainder of said mating terminals spaced progressively further apart from said nearby feeler so as to contact the remainder of terminals on said nearby feeler as said feeler is further deflected, and (d) means associated with each of said feelers having contacts mounted thereon and having mating terminals spaced thereapart for forming an electrical signal, said means forming different signals to indicate gradations of deflection of each of said feelers, and (e) a warning device mounted on said vehicle to inform the operator of said vehicle of the internal pressure of each of said tires in response to signals formed by said means upon deflection of said feelers.

4. A tire deflation signalling device adapted for installation on a wheeled vehicle equipped with an inflatable tire, comprising:

(a) a flexible feeler fixedly mounted at the upper end adjacent a wheel having an inflatable tire mounted thereon to extend from the underside of a vehicle toward the roadway and terminating thereabove when said inflatable tire has standard internal air pressure, said feeler being of such a length to contact the roadway on occurrence of a predetermined amount of deflation of said tire so that said feeler deflects rearwardly when said vehicle moves in a forward direction, (b) a plurality of terminals mounted on the rearward side of said feeler at various locations on the deflectable portion thereof, said terminals having a contacting surface sloping downward and away from said feeler, (c) mating terminals spaced apart from said feeler with the uppermost mating terminal located to contact the uppermost terminal on the rearward side of said feeler when said feeler is slightly deflected by contact with said roadway, and the remainder of said mating terminals spaced progressively further apart from said feeler so as to contact the remainder of terminals on said feeler as said feeler is further deflected, all of said mating terminals having a conforming surface for slidable contact with said terminals mounted on said feeler, (d) means forming an electrical circuit when said feeler is deflected to cause contact between one of said feeler terminals and one of said mating terminals, said means forming different signals to indicate gradations of deflection of said feeler, (e) a warning device mounted on said vehicle to inform the operator of said vehicle of the internal pressure of said inflatable tire in response to signals formed by said means upon deflection of said feeler.

References Cited by the Examiner

UNITED STATES PATENTS

| 2,258,334 | 10/1941 | Miller | 200—61.24 |
| 2,640,119 | 5/1953 | Bradford | 200—61.24 |
| 2,647,967 | 8/1953 | Moot | 200—61.24 |
| 3,055,998 | 9/1962 | Collins | 340—58 |

FOREIGN PATENTS 742,482  12/1932  France.

NEIL C. READ, *Primary Examiner.*

ALVIN H. WARING, *Assistant Examiner.*